Patented Oct. 29, 1935

2,019,443

UNITED STATES PATENT OFFICE 2,019,443

SULPHUR COMPOSITION

Ludwig J. Christmann, Jersey City, and David W. Jayne, Jr., Elizabeth, N. J., assignors to American Cyanamid Company, New York, N. Y., a corporation of Maine No Drawing. Application November 23, 1932, Serial No. 644,074

9 Claims. (Cl. 167—20)

This invention relates to the conditioning of pulverulent materials and it has particular relation to the dispersion of such materials into a carrier medium. The main objects of the invention are to provide a pulverulent material or pigment which may be readily wetted by the medium into which it is to be dispersed; to provide a pulverulent or pigmentary material which may be readily dispersed in a carrier medium without the formation of clots or lumps; and particularly to provide a form of powdered sulphur which may be readily dispersed in water without such formations.

Heretofore certain pulverulent materials, such as sulphur, have been extensively used as insecticides, fungicides, and for similar purposes. In such use they are ordinarily applied either in the form of dry powder or else they are sprayed as suspensions in water. With materials such as sulphur, difficulty has been encountered in the use thereof for the above indicated purposes because of a tendency when they are in dry form to lump together. It is also found that many of these pulverulent or pigmentary materials even though they have not been standing for a sufficient period of time to permit lump formation, are difficult to admix as a uniform dispersion in the carrier medium because of the difficulty of obtaining proper wetting action of the medium upon the surfaces of the component particles.

It has heretofore been observed that better flowing of the sulphur for dusting purposes and retardation of lump formation may be obtained by admixing it with a finely divided, relatively inert material, such as magnesium oxide, tri-calcium phosphate or a relatively fine dry grade of ordinary clay. It has also been observed that wettability of the powdered material is to some extent promoted by the use of the above indicated powdered substances. However, it is found that a higher degree of wettability is obtained if the sulphur is admixed with a small amount of what is termed a wetting agent, such as pine oil or di-cresyl dithiophosphoric acid, or by admixture with cresylic acid. It is known that these flow promoting agents may be introduced into sulphur simultaneously and that when so introduced, the two types of materials exert their action independently of each other, thereby producing a sulphur compound which will flow readily in a dusting process, and which does not readily lump, and which also may readily be wetted by a carrier medium such as water. The material thus exhibits greatly improved characteristics as compared with ordinary materials. However, it is found that under certain conditions there is some tendency for the particles of finely divided sulphur to clot together or coagulate in the carrier liquid even though the surfaces of the particles are completely wetted by the latter. These clots thus formed by the wetted sulphur particles may under some conditions tend to clog relatively fine spray nozzles employed in the application of the sulphur as a spray.

This invention involves the discovery that by introducing into a powdered pigmentary material, such as sulphur smoke, finely divided liquorice root, the wetting of the particles is promoted, and at the same time clotting is inhibited or at least greatly lessened, and this is true even though the finely divided particles are also admixed with a wetting agent such as pine oil, Turkey red oil or carbitol and a flow promoting agent such as finely divided clay or magnesium oxide.

The liquorice is preferably employed as a dry powder obtained by grinding ordinary liquorice root, and it may be admixed with the untreated sulphur powder, thereby materially enhancing the flowing action of the latter and at the same time promoting the wettability of the powder and preventing or greatly retarding the tendency of the particles of sulphur in the carrier medium to clot or cling together. As previously indicated, it is also found that the sulphur prior to, simultaneously with, or after addition of the liquorice root may be admixed with wetting agents such as those previously mentioned, and also with flowing agents, thereby securing sulphur powders which exhibit to the fullest extent the free flowing characteristics and the wettability of the sulphur powders disclosed in the above indicated co-pending application, and at the same time being characterized by the fact that they will not clot in the carrier liquid.

The following constitutes a specific example of a finely divided sulphur containing material which is characterized by the fact that it will not readily lump when in dry form and which may also be dispersed in water with comparative ease and without the formation of clots. The material is of particular value as a dusting powder.

| | Per cent |
|---|---|
| Sulphur smoke | 91 |
| Dixie clay | 7 |
| Liquorice root | 2 |

A material which may be dispersed somewhat more readily in water may be prepared as follows:—

| | Per cent |
|---|---|
| Sulphur smoke | 91.5 |
| Dixie clay | 7 |
| Liquorice root | 1 |
| Pine oil | .5 |

Novel features of the composition in the formula:
Qualities of being free flowing and non-flocculating.
Dixie clay gives free flowing property.
Pine oil etc., gives wetting property.
Liquorice root prevents flocculation.

The occurrence of flocculation is easily determined by shaking a small amount of the dry sulphur mixture with water. Flocculation is evidenced by a curdy layer of flocked or clotted sulphur on the top of the water after shaking. If a suitable deflocculating agent has been incorporated with the sulphur, shaking produces only a small amount of clean foam on the surface of the water. The term "deflocculating agent" is therefore used to define a substance which, when incorporated with dry powdered sulphur, will substantially prevent the formation of clots or flocs upon shaking the dry mixture with water.

The tendency of powdered sulphur when treated with wetting agents, such as pine oil, cresylic acid, sulphonated castor oil, etc., upon shaking with water to float, may be reduced by incorporating with the treated sulphur an agent such as the alkaline salt of a phenol-sulphur condensation product. This material is described in detail in Patent 1,882,777 to Crossley and Dolt. The mordant is used in small proportions, as little as 0.1% based upon sulphur content having a pronounced effect. By use of 0.4%, in a powder containing 0.2% pine oil, the tendency of the powder to float is eliminated. The treatment also further enhances wettability of the sulphur.

In place of pine oil as a wetting agent other compounds may be used. For example, the sodium salt of the material derived by reacting naphthalene with sulphuric acid in the presence of butyl alcohol gives good results. The structure of this compound is indefinite, but it probably can be represented thus:—

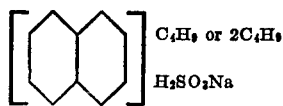

Another class of sodium sulphonates which may be used has the probable type formula—$C_nH_{2n+1}SO_3Na$ where $n$ varies from 8 to 16, but preferably in the higher value.

A material containing an ether linkage and of the probable type formula—$C_nH_{2n+1}OSO_3Na$ where $n$ is a whole number from 8 to 16, but preferably the higher value, is also usable. These compounds may be employed in the following mixture:—

| | Percent |
|---|---|
| Wetting agent | 0.5 |
| Liquorice root | 1.0 |
| Dixie clay | 5.0 |
| Sulphur | 93.0 |

These wetting agents are found to be of advantage over pine oil because when applied to sulphur they are less subject to loss by evaporation and they exhibit less tendency to lose their efficiency through polymerization.

As previously indicated, Turkey red oil and carbitol are also good substitutes for pine oil.

In these specific examples any relatively fine dry grade of clay may be used. It is also to be understood that the invention is not limited to these specific formulae but that the proportions of the various ingredients may be varied over a considerable range and that the clay may be replaced by other suitable finely divided agents such as magnesium oxide or tri-calcium phosphate, previously referred to.

It will be apparent that the amount of inert diluent introduced with the sulphur smoke is comparatively small so that practically the full effects of pure sulphur are obtained and that these diluents are relatively inexpensive. The sulphur mixtures thus obtained as previously indicated, may be readily mixed with water or similar carrier agents without the formation of clots or agglomerates which frequently characterize sulphur suspensions prepared by methods heretofore available to the art. The materials may also be left as dry powders for long periods of time without the formation of lumps, and for that reason they may be readily dusted with a minimum of waste upon plants. Although we have described only the preferred embodiments of the invention, it is to be understood that the latter is not limited to these specific forms, but that numerous modifications may be made therein without departure from the spirit thereof or from the scope of the appended claims.

We claim:

1. Sulphur in powdered form intermixed with pine oil and liquorice root.

2. Sulphur in powdered form admixed with liquorice root and an ester of a higher alcohol and an inorganic acid.

3. Sulphur in powdered form admixed with liquorice root and an alkyl sulphonic acid ester.

4. Sulphur in powdered form admixed with a wetting agent having floating properties and an alkali metal salt of a phenol-sulphur condensation product.

5. Sulphur in powdered form admixed with pine oil and an alkali metal salt of a phenol-sulphur condensation product.

6. A method of reducing the tendency of powdered sulphur treated with a wetting agent having floating properties to float upon agitation, which comprises incorporating therewith an alkali metal salt of a condensation product of phenol and sulphur.

7. A method of reducing the tendency of sulphur powder containing pine oil to float upon agitation, which comprises adding thereto an alkali metal salt of a condensation product of phenol and sulphur.

8. An insecticide comprising powdered sulphur, a wetting agent having wetting properties in an acid medium and a deflocculating agent.

9. An insecticide comprising powdered sulphur, a wetting agent selected from the group consisting of pine oil, cresylic acid, dicresyl dithiophosphoric acid, carbitol, sulphuric acid condensation products of aliphatic alcohols with aromatic hydrocarbons, and the sulphonated higher paraffins, paraffin alcohols and vegetable oils, and a deflocculating agent capable of inhibiting the flocculation of sulphur in the presence of a wetting agent.

LUDWIG J. CHRISTMANN,
DAVID W. JAYNE, Jr.